B. F. GOLLMAR.
VAPOR STOVE.
APPLICATION FILED OCT. 7, 1916.
1,220,413.
Patented Mar. 27, 1917.
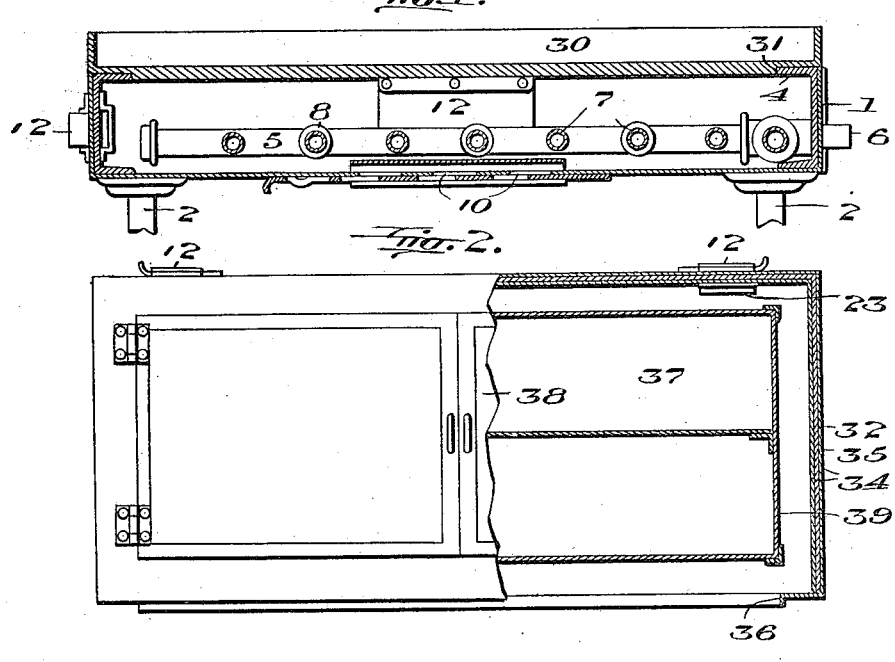

UNITED STATES PATENT OFFICE.

BENJAMIN F. GOLLMAR, OF BARABOO, WISCONSIN.

VAPOR-STOVE.

1,220,413.    Specification of Letters Patent.    Patented Mar. 27, 1917.

Original application filed April 17, 1916, Serial No. 91,778. Divided and this application filed October 7, 1916. Serial No. 124,392.

*To all whom it may concern:*

Be it known that I, BENJAMIN F. GOLLMAR, a citizen of the United States, residing at Baraboo, in the county of Sauk and State of Wisconsin, have invented new and useful Improvements in Vapor-Stoves, of which the following is a specification.

My present invention pertains to vapor stoves; and it consists in a construction and relative arrangement of stove body, burner, and cooking unit, designed more particularly for embodiment in the stove disclosed in my contemporary application filed April 17, 1916, Serial Number 91,778, of which this application is a division.

My present invention will be fully understood from the following description and claims, when the same are read in connection with the drawing, accompanying and forming part of this specification, in which:

Figure 1 is a central vertical section through the improved stove body, the burner and the frying-pan unit.

Fig. 2 is a view, partly in front elevation and partly in section, of the oven unit.

Fig. 3 is a similar view of the pot unit.

Fig. 4 is a detail transverse section taken through one of the ventilators.

Similar numerals of reference designate corresponding parts in all of the views of the drawings.

My improved stove is preferably portable in character, and comprises a shallow body 1, open at its upper side, and legs 2, preferably of gas pipe, arranged under and supporting the body.

In the body 1 is a burner space which occupies practically all of the interior of the body, and is preferably surrounded by a channel-iron or other frame 4, and in said burner space is disposed a horizontally-disposed vapor or gas burner 5, designed to be supplied with vapor or gas through a conduit 6, and having horizontal burner tubes 7 and caps 8 at the ends thereof, as fully shown in my contemporary application before alluded to.

For supporting combustion in the burner space, the body 1 is provided in its bottom wall with one or a plurality of groups of apertures 10, and one or more slidable apertured dampers for controlling—*i. e.*, regulating the size of the apertures 10, as occasion demands. It will also be observed that the burner space is provided in its side walls with protected ventilators 12, and that similar ventilators 13 and 14 are provided in the side walls of the pot unit, Fig. 3, near the top thereof, and in the top wall of the oven unit, Fig. 2, adjacent to the sides of the said oven unit. The said protected ventilators are of the same construction and therefore a detailed description of the one shown in Fig. 4 will suffice to impart a definite understanding of all. The ventilator specifically referred to comprises a slide 20, movable in guides 21 and arranged to control an opening 22 in the wall, and an interior guard 23 attached to said wall and open at each end and closed on the sides. When deemed expedient, the ventilators in the bottom wall of the body, below the burner space 3, may also be of the protected type just specifically described.

The stove without the protected ventilators in the body 1 as described cannot be successfully operated in the open air because the heat and products of combustion cannot circulate. It will be noted, however, that while the protected ventilators admit ample atmospheric air to support combustion and to promote circulation of the heated air in the body 1 and to regulate the heat in said body, they preclude the entrance of any drafts that would be calculated to interfere with the normal and proper working of the stove. I would also have it understood that when the stove is used for frying, the side ventilators in the body 1 give rise to rapid heat circulation conducive of a successful frying operation, and prevent dead ends or pockets such as would interfere with thorough heat circulation and proper operation of the stove.

As shown in Fig. 1 a frying pan unit 30 is removably arranged on the body 1; said frying pan unit being flanged to prevent casual displacement thereof.

The scheme of my invention contemplates the use of the frying pan unit 30, the oven unit 32, Fig. 2, and the pot unit 33, Fig. 3, interchangeably on the body 1 so that each may be used over and in combination with a single heating means.

The oven unit 32 is provided with outer walls made up of sheet-metal layers 34 and an interposed asbestos layer 35, and when desired or deemed expedient the outer walls of the body 1, may be similarly constructed. This latter, however, I have deemed it unnecessary to illustrate. The said oven unit 32 is flanged at 36 to fit on the body 1, is open at its bottom, and is provided in its closed top with protected ventilators 12 similar to the ventilators 12 before referred to. Arranged in and forming a permanent part of the oven unit is a food-receiving chamber 37 equipped with doors 38. Spaces are provided at the sides and top, respectively, of the chamber 37, and when the oven unit is in use on the body 1, it will be manifest that the proper manipulation of the ventilators 12 will permit escape of the products of combustion so as to give rise to adequate circulation of heat about the chamber 37, and yet, by virtue of the ventilators 12 having the guards 23, wind is prevented from interfering with the operation of the stove in the open.

The outer wall and top flange of the pot unit 33 are constructed similarly to the outer walls of the oven unit 32, and the pot unit is also provided with a flange 3, and with the protected ventilators 13 and 14; the latter being designed to serve the function ascribed to the ventilators 12 of the oven unit. Permanently secured in the unit 33 is a pot 40, spaced from the side walls of the unit for the circulation of heat, and equipped with a removable flanged cover 41. The pot unit 33 is used on the body 1 when the frying pan unit 30 and the oven unit 32 are idle. This interchangeable capacity of the three units described, will be appreciated as an important advantage when it is stated that the stove is especially adapted for use as a part of a circus or camp outfit, and that it takes up but little space in storage or in use. It is also to be noted that the construction as a whole is light in weight, simple and inexpensive, and that no parts are included such as are liable to get out of order after a short period of use.

Having described my invention, what I claim and desire to secure by Letters-Patent, is:

1. In a vapor or gas stove, the combination of a stove casing having ventilation openings, and interior guards closed at their sides and open at their ends, and exterior regulating means complementary to said openings.

2. A cooking unit for use on a stove of the character described, including an exterior casing having an opening in its bottom wall and a depending flange surrounding the said opening and the casing also having vent openings, interior guards opposite and complementary to said openings and closed at their sides and open at their ends, exterior regulating means also opposite and complementary to said vent openings, and a compartment closed at its bottom and adapted to be charged with substance to be cooked; the said compartment being arranged in and fixed to the casing and separated therefrom by an intervening space in communication with the opening in the bottom wall of the casing and also in communication with said vent openings.

In testimony whereof I have hereunto set my hand in presence of two subscribing witnesses.

BENJAMIN F. GOLLMAR.

Witnesses:
ERNEST LAUDERS,
W. T. RAY.

Copies of this patent may be obtained for five cents each, by addressing the "Commissioner of Patents. Washington, D. C."